May 15, 1923.
L. L. BELNAP
INSECT TRAP
Filed April 10, 1922
1,455,100
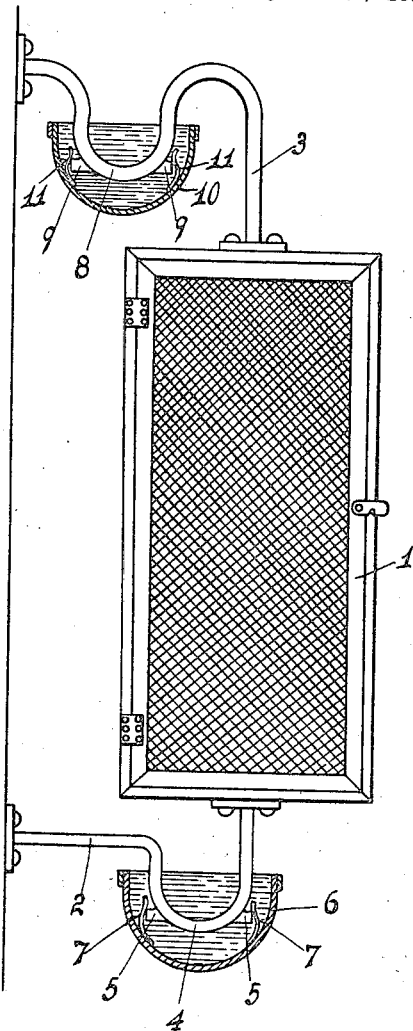
Inventor
Lewie L. Belnap.
By Harry C. Schweder
Attorney Patented May 15, 1923.

1,455,100

UNITED STATES PATENT OFFICE.

LEWIE L. BELNAP, OF OAKLAND, CALIFORNIA.

INSECT TRAP.

Application filed April 10, 1922. Serial No. 550,961.

*To all whom it may concern:*

Be it known that I, LEWIE L. BELNAP, a citizen of the United States, residing at Oakland, in the county of Alameda and State of California, have invented certain new and useful Improvements in Insect Traps, of which the following is a specification.

My invention is an improved insect trap particularly constructed to be detachably secured to the brackets of a food container to trap insects such as ants and prevent such insects from entering the container.

Referring to the drawing forming a part of this specification the figure is a view of a food container mounted on brackets and my insect trap detachably mounted on said brackets, the container being shown in elevation and the trap being shown in section.

In the drawing 1 indicates a food container which is mounted at the bottom on a wall bracket 2 and at the top on a wall bracket 3. The bracket 2 is formed with a depending gooseneck 4 from which projects a pair of lugs 5. A bowl 6 is fitted over the gooseneck 4 and a pair of spring clips 7 secured to the inside of said bowl engage said lugs and detachably hold said bowl on said gooseneck. The bracket 3 is formed with a depending gooseneck 8 from which project a pair of lugs 9. A bowl 10 is fitted over the gooseneck 8 and a pair of spring clips 11 secured to the inside of said bowl engage said lugs and detachably hold the bowl on the gooseneck. The bowls 6 and 10 are filled with water into which the insects fall when trying to walk along the goosenecks 4 and 8, and are drowned.

Having described my invention, I claim:

An insect trap including a bracket for supporting a food container, said bracket being formed with a gooseneck, a pair of lugs on said gooseneck, a bowl fitting over said gooseneck, and a pair of spring clips secured to the inside of said bowl for engaging said lugs and detachably holding said bowl upon said gooseneck.

In testimony whereof I affix my signature.

LEWIE L. BELNAP.